United States Patent
Olenski (10) Patent No.: US 10,240,555 B2
(45) Date of Patent: Mar. 26, 2019

(54) FLUID CONDUIT ASSEMBLY FOR CONNECTING ORTHOGONALLY ORIENTED FLUID CONNECTIONS

(71) Applicant: Fairbanks Morse, LLC, Charlotte, NC (US)

(72) Inventor: Brian Raymond Olenski, Beloit, WI (US)

(73) Assignee: Fairbanks Morse, LLC, Charlotte, NC (US)

( * ) Notice: Subject to any disclaimer, the term of this patent is extended or adjusted under 35 U.S.C. 154(b) by 249 days.

(21) Appl. No.: 15/098,192

(22) Filed: Apr. 13, 2016

(65) Prior Publication Data
US 2018/0216569 A1 Aug. 2, 2018

(51) Int. Cl.
*F16L 41/00* (2006.01)
*F02F 1/10* (2006.01)
(Continued)

(52) U.S. Cl.
CPC .............. *F02F 1/10* (2013.01); *F16L 19/065* (2013.01); *F16L 23/08* (2013.01); *F16L 23/18* (2013.01);
(Continued)

(58) Field of Classification Search
CPC .......... F02F 1/10; F02F 2001/104; F02F 1/14; F02F 1/16; F16L 27/042; F16L 27/044;
(Continued)

(56) References Cited

U.S. PATENT DOCUMENTS

| | | | | |
|---|---|---|---|---|
| 954,504 A | * | 4/1910 | Drew | F16L 27/0837 285/181 |
| 1,368,522 A | * | 2/1921 | Newcomb | F02F 1/16 123/193.3 |
| 1,500,861 A | * | 7/1924 | Zbinden | F02F 1/10 123/41.82 R |
| 1,653,718 A | * | 12/1927 | Mauss | F02F 1/10 123/41.72 |

(Continued)

FOREIGN PATENT DOCUMENTS

CN 203384533 U 1/2014
GB 1 426 559 A 3/1976

OTHER PUBLICATIONS

International Application No. PCT/US2017/026818, International Search Report & Written Opinion, 9 pages, Jun. 27, 2017.

*Primary Examiner* — David Bochna
(74) *Attorney, Agent, or Firm* — Perkins Coie LLP (57) ABSTRACT

Technology is provided for a fluid conduit assembly for connecting orthogonally oriented connections. The assembly includes a first tube arcuately extending from a first proximal end portion to a first distal end portion. The first proximal end portion includes a first fitting connectable to a first fluid connection. A second tube arcuately extends from a second proximal end portion to a second distal end portion. The second proximal end portion includes a second fitting connectable to a second fluid connection that is orthogonally oriented with respect to the first fluid connection. A coupling connects the first distal end portion and the second distal end portion. The first rigid tube is rotatably positionable with respect to the first fluid connection whereby a first distal axis and a second distal axis are substantially coaxially aligned when the first fitting and second fitting are connected to the first and second fluid connections, respectively.

20 Claims, 7 Drawing Sheets

(51) Int. Cl.
*F16L 27/107* (2006.01)
*F16L 19/065* (2006.01)
*F16L 23/08* (2006.01)
*F16L 23/18* (2006.01)
*F16L 25/12* (2006.01)
*F16L 27/08* (2006.01)
*F01P 11/04* (2006.01)
*F16L 41/08* (2006.01)

(52) U.S. Cl.
CPC .......... *F16L 25/12* (2013.01); *F16L 27/0841* (2013.01); *F16L 27/107* (2013.01); *F01P 11/04* (2013.01); *F16L 41/004* (2013.01); *F16L 41/086* (2013.01)

(58) Field of Classification Search
CPC ... F16L 27/08; F16L 27/0804; F16L 27/0808; F16L 27/0837; F16L 27/0845; F16L 41/004; F16L 41/007
USPC .......................... 285/181, 273, 275
See application file for complete search history.

(56) References Cited

U.S. PATENT DOCUMENTS

| | | | | |
|---|---|---|---|---|
| 1,756,094 | A * | 4/1930 | McGuirk | F16L 27/0832 222/533 |
| 1,968,449 | A * | 7/1934 | Hefti | F02F 1/16 123/41.8 |
| 2,395,766 | A * | 2/1946 | Schreck | F02F 1/16 123/41.79 |
| 2,587,938 | A * | 3/1952 | Warren | F16L 27/08 285/184 |
| 4,407,533 | A | 10/1983 | Giebeler | |
| 4,932,687 | A | 6/1990 | Anderson et al. | |
| 7,909,636 | B2 * | 3/2011 | Brodeur | H02G 3/06 285/181 |
| 2002/0050260 | A1 | 5/2002 | Harvey | |
| 2003/0127854 | A1 * | 7/2003 | Lehnhardt | F16L 27/0845 285/181 |
| 2005/0247155 | A1 * | 11/2005 | Liu | F16L 27/0837 74/490.05 |
| 2006/0131873 | A1 | 6/2006 | Klingbail et al. | |
| 2012/0240884 | A1 | 9/2012 | Zahdeh et al. | |

* cited by examiner

FLUID CONDUIT ASSEMBLY FOR CONNECTING ORTHOGONALLY ORIENTED FLUID CONNECTIONS

TECHNICAL FIELD

This patent application is directed to engine cooling systems and, more specifically, to a fluid conduit assembly.

BACKGROUND

Typical engine cooling systems supply coolant to the engine from a heat rejection device, such as a radiator or cooling tower. The coolant flows through various passageways and jackets in the engine and returns to the radiator, for example. The transport of coolant requires various connections on the engine and between the engine and either a vehicle or facility connection in the case of stationary engine applications. These connections are typically accomplished by hose or rigid connections designed to accommodate vibration and misalignment.

BRIEF DESCRIPTION OF THE DRAWINGS

Embodiments of the fluid conduit assembly introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

In some applications, a rigid coolant conduit is preferred over a flexible hose; particularly where the connections are close together and awkwardly oriented with respect to each other. However, a rigid tube does not allow sufficient adjustability to accommodate tolerance stack-up between connection locations. A fluid conduit assembly for connecting orthogonally oriented fluid connections is disclosed. In an embodiment, the assembly includes a first rigid tube arcuately extending from a first proximal end portion to a first distal end portion. The first proximal end portion includes a first fitting connectable to a first fluid connection, and the first distal end portion extends along a first distal axis. The assembly also includes a second rigid tube arcuately extending from a second proximal end portion to a second distal end portion. The second proximal end portion includes a second fitting connectable to a second fluid connection that is orthogonally oriented with respect to the first fluid connection. The second distal end portion extends along a second distal axis. In some embodiments, a coupling connects the first distal end portion and the second distal end portion for fluid communication therebetween. The first rigid tube is rotatably positionable with respect to the first fluid connection whereby the first distal axis and the second distal axis are substantially coaxially aligned when the first fitting and second fitting are connected to the first and second fluid connections, respectively. Accordingly, the disclosed fluid conduit assembly provides a rigid coolant connection while providing adjustability to accommodate inconsistencies (e.g., tolerance stack-up) in connection locations. The disclosed rigid coolant conduits also allow for relatively high fluid flow rates in a compact design suitable for confined spaces.

General Description

Various examples of the device and systems introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
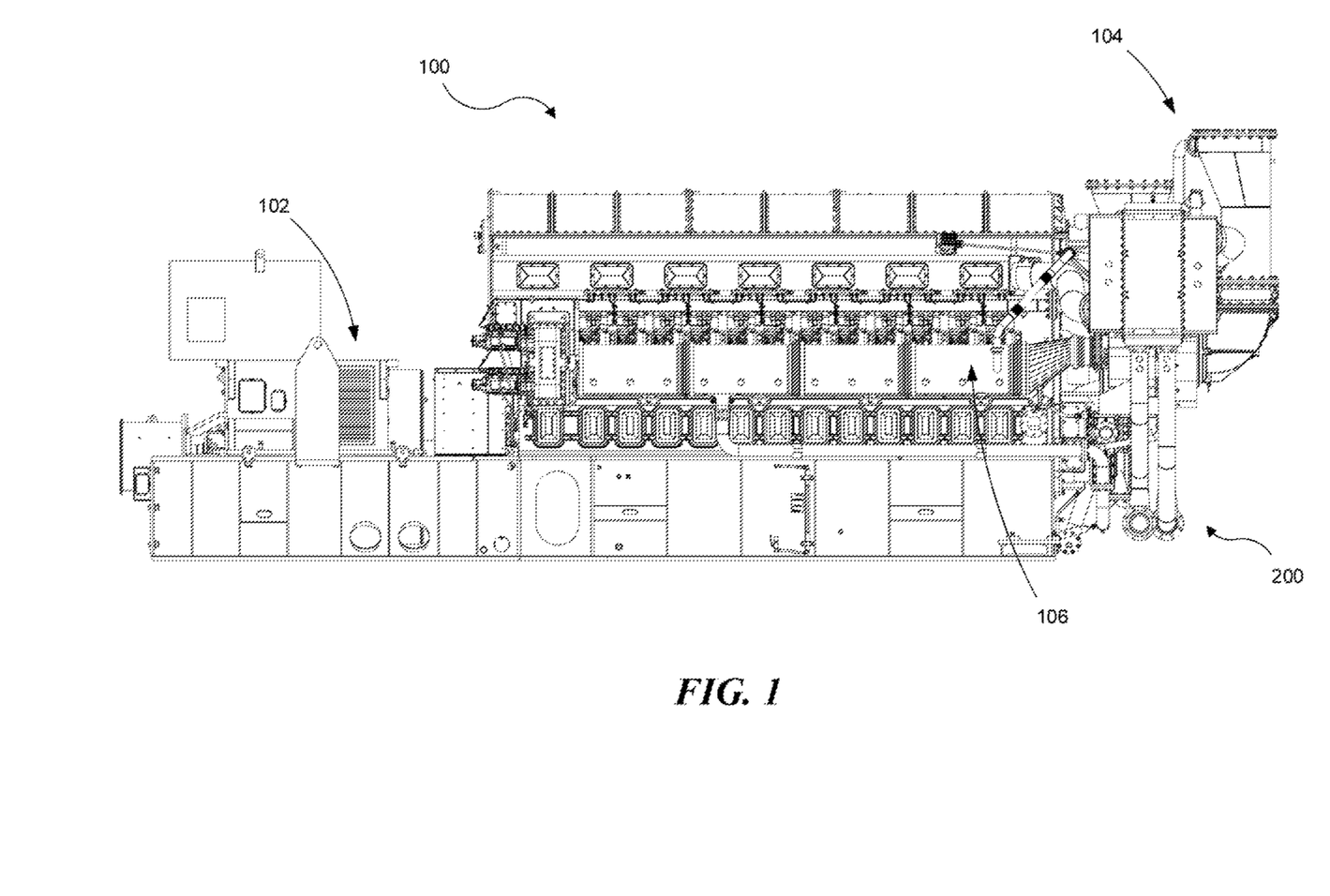
FIG. 1 is a side view in elevation of a multi-cylinder opposed piston engine according to a representative embodiment.

FIG. 1 illustrates a vertically oriented multi-cylinder opposed piston engine 100 according to a representative embodiment. In some embodiments, engine 100 is configured for electrical power generation and is connected to a generator 102. In other embodiments, the engine may directly or indirectly drive equipment or propulsion systems, such as for example and without limitation, pumps, drivetrains, wheels, propellers, gearboxes, etc. Engine 100 may be used in mobile as well as stationary applications. The engine 100 includes various systems, such as a cooling system 200, described more fully below, as well as an air intake system 104, and an exhaust system 106, for example.

Figure 2:
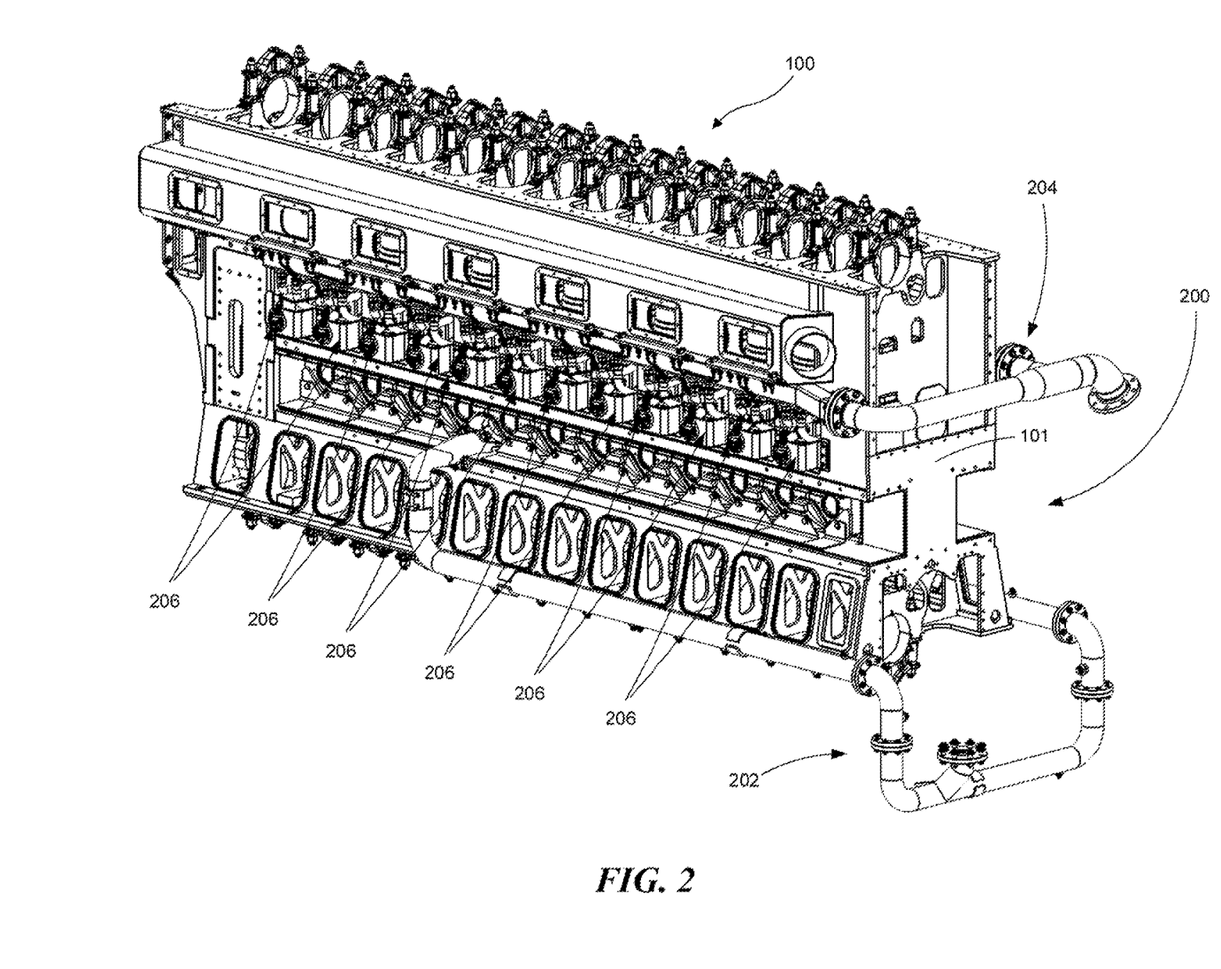
FIG. 2 is an isometric view of the engine shown in FIG. 1 as viewed from the front with various components removed for clarity.

As shown in FIG. 2, the cooling system 200 includes an inlet manifold assembly 202 that provides coolant to the cylinders 206. In the illustrated embodiment, engine 100 includes 12 cylinders, each of which is supplied by the inlet manifold assembly 202. Hot coolant flowing from the cylinders 206 is collected via outlet manifold assembly 204. It should be appreciated that the inlet manifold assembly 202 supplies relatively cool fluid or coolant to the engine, which is then returned, via the outlet manifold assembly 204, to a radiator, heat exchanger, or cooling tower, for example.

Figure 3:
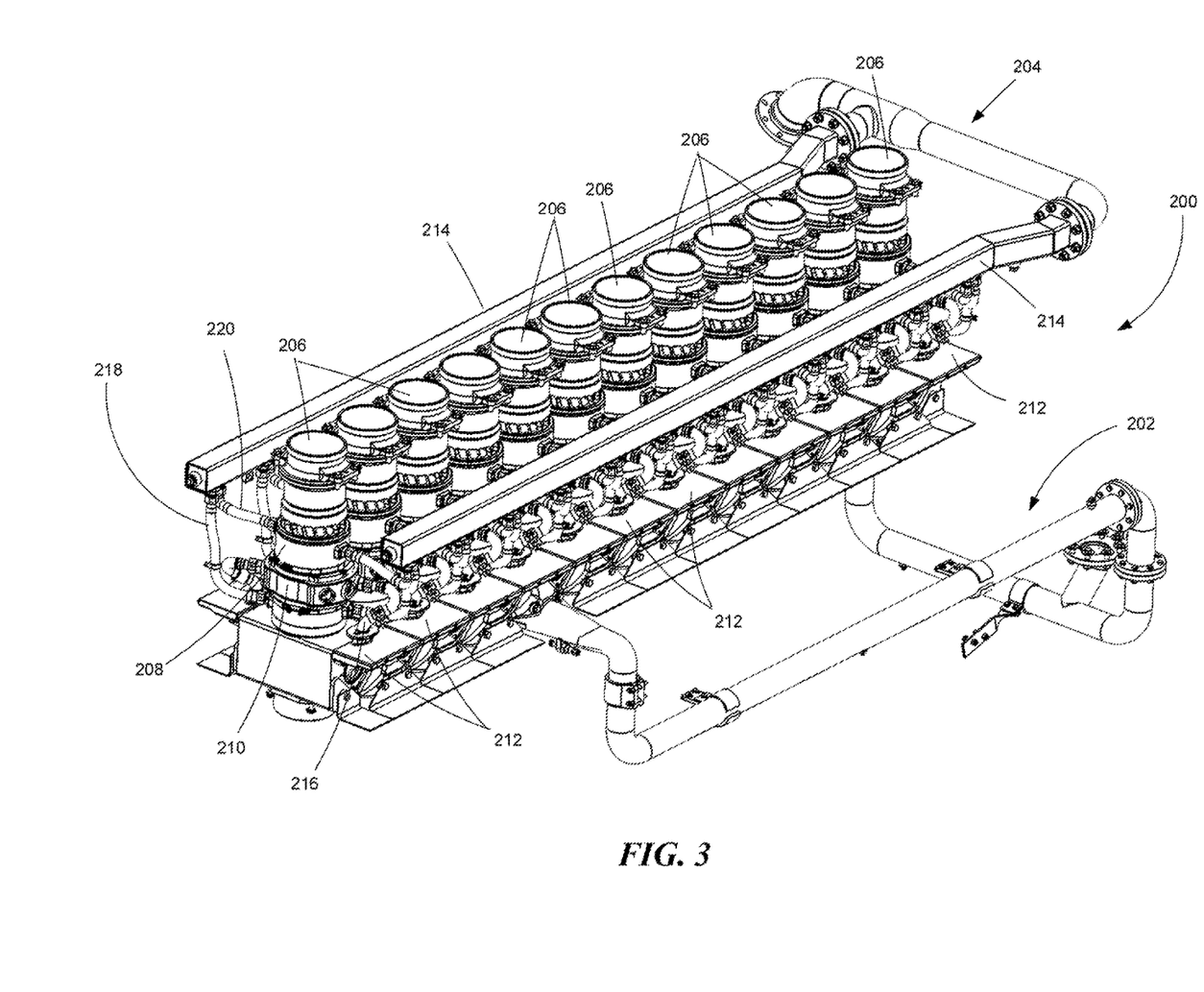
FIG. 3 is an isometric view of the cooling system shown in FIGS. 1 and 2 as viewed from the back of the engine.

With reference to FIG. 3, the inlet manifold assembly 202 supplies coolant to each of the cylinders 206 through a cooling deck 212 which in turn supplies coolant to an inlet fluid conduit assembly 216. The inlet fluid conduit assembly 216 is connected to a cooling collar 210 that feeds the coolant to the cylinder sleeve 208. Coolant exits the cylinder sleeve 208 through upper and lower coolant lines 218 and 220, respectively. Coolant lines 218 and 220 are connected to a coolant return rail 214. Each cylinder 206 is supplied with coolant on both sides of the engine.

Figure 4:
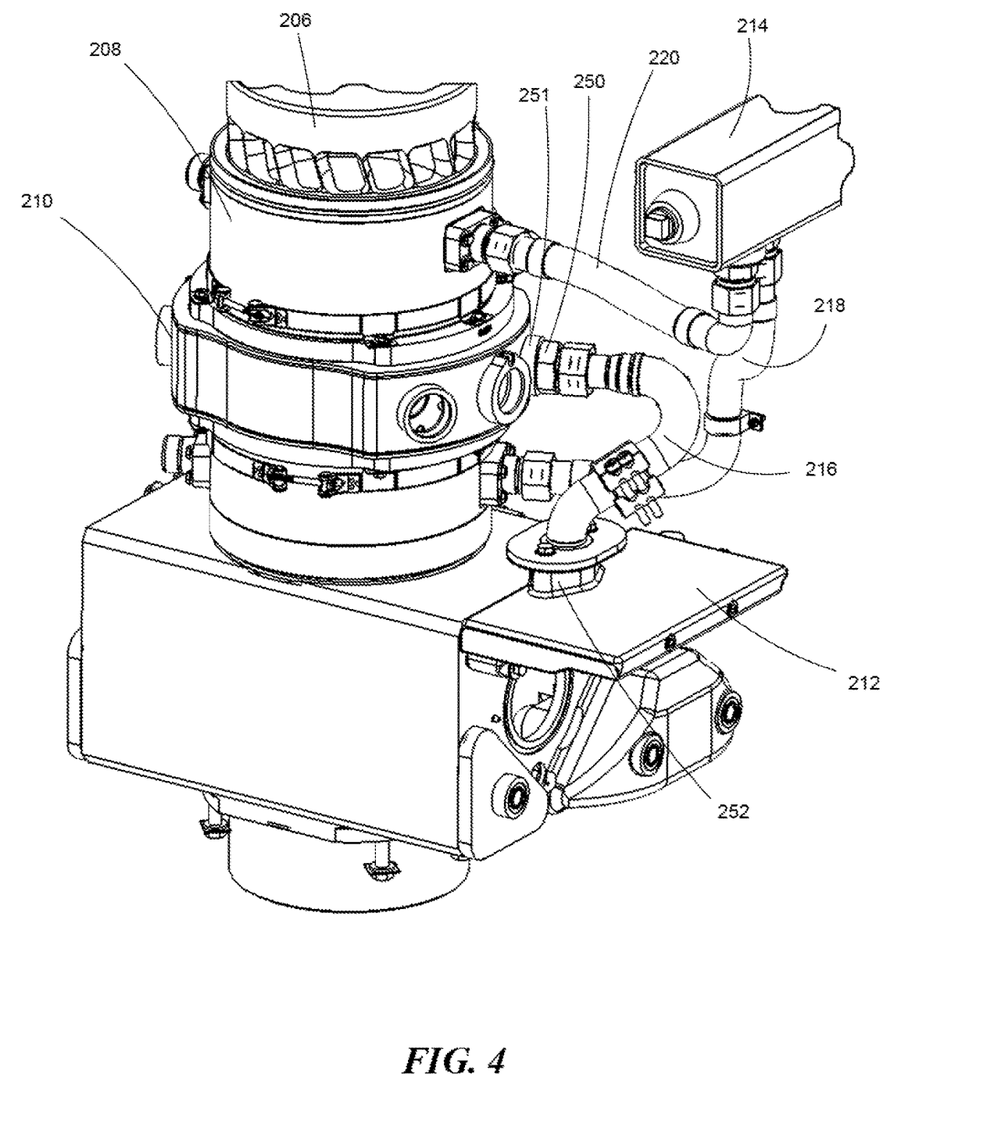
FIG. 4 is an isometric enlarged partial view of the cooling system illustrating the connection of the inlet and outlet conduits.
Figure 5:
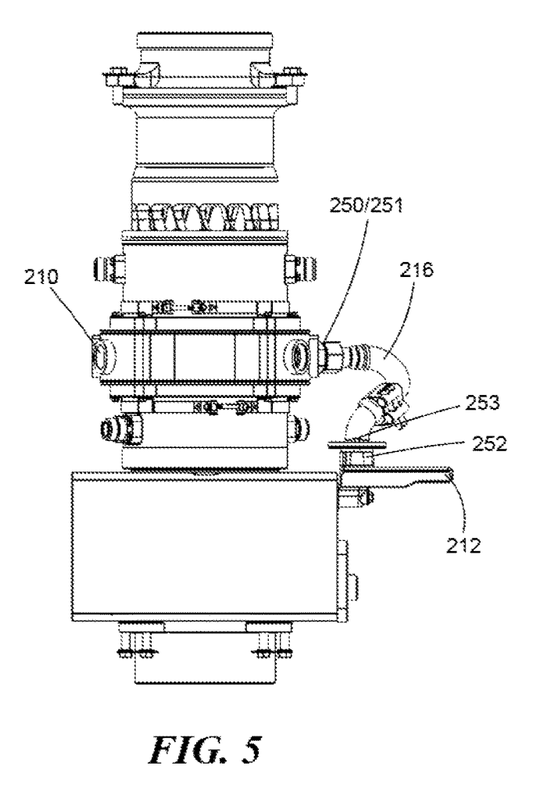
FIG. 5 is a side view in elevation of the fluid conduit assembly extending between the cooling deck and cooling collar.
Figure 6:
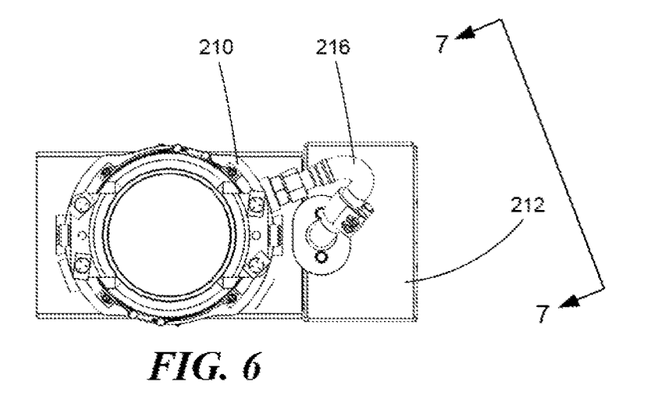
FIG. 6 is a top view of the fluid conduit assembly.
Figure 7:
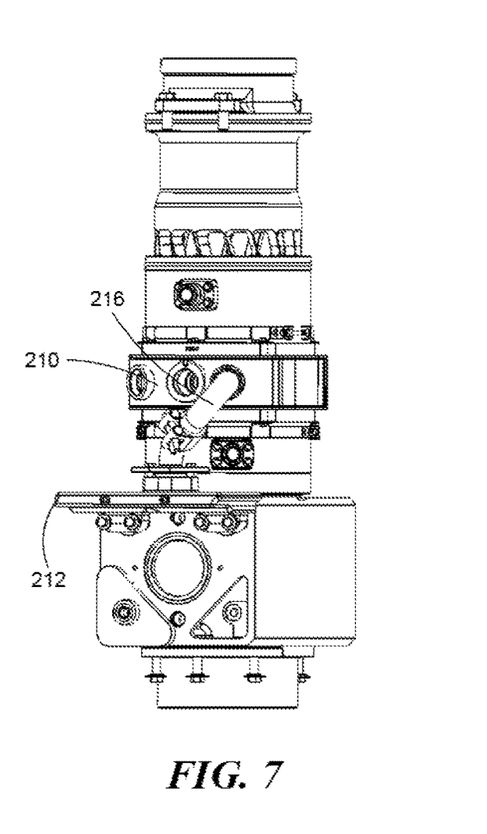
FIG. 7 is a side view of the fluid conduit assembly taken about lines 7-7 in FIG. 6.

FIG. 4 illustrates the coolant inlet and outlet connections for one side of a single cylinder. The fluid conduit assembly 216 connects to the cooling deck 212 at a boss 252 and connects to the cooling collar 210 at a collar fitting 250. In some embodiments, the collar fitting 250 attaches to the cooling collar 210 at a threaded boss 251. With further reference to FIGS. 5-7, it can be appreciated that the fluid conduit assembly 216 connects orthogonally-oriented fluid connections. Specifically, boss 252 is orthogonally oriented with respect to the cooling collar fitting 250.

Figure 8:
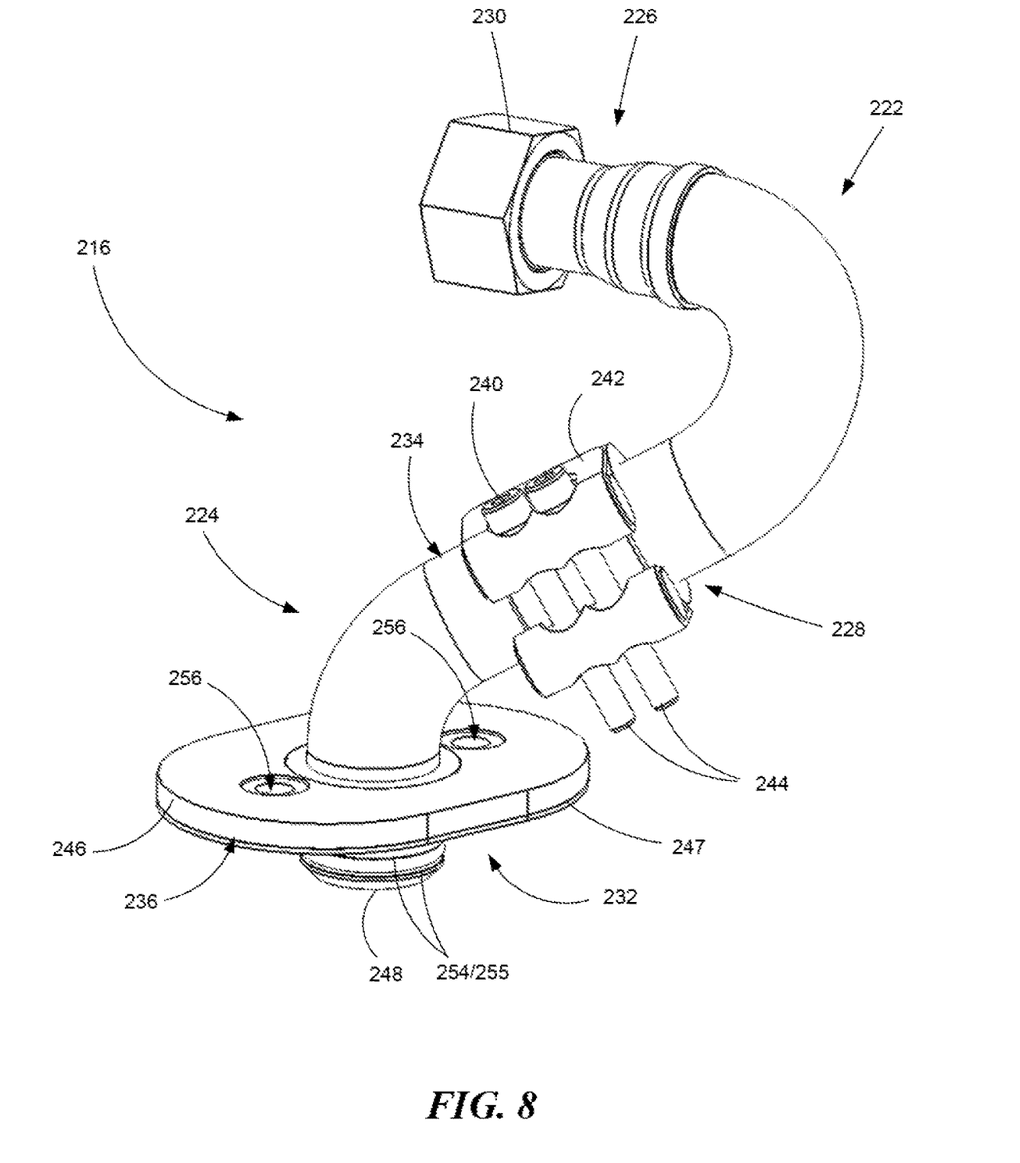
FIG. 8 is an isometric view of the fluid conduit assembly.

As shown in FIG. 8, the coolant conduit assembly 216 includes a first rigid tube 222 extending arcuately from a first proximal end portion 226 to a distal end portion 228. The proximal end portion 226 includes a fitting 230 connectable to the cylinder cooling collar 210 via collar fitting 250 (shown in e.g., FIG. 5). In the embodiment depicted in FIG. 8, the fitting 230 is an O-ring face seal fitting that allows rotational adjustment about the axis of the fitting. In other embodiments, the fitting 230 could be a flared tube fitting or other style of fitting that allows at least some amount of rotational adjustment. The fluid conduit assembly 216 also includes a second rigid tube 224 arcuately extending from a proximal end portion 232 to a distal end portion 234. The proximal end portion 232 includes a fitting 236 that is configured to connect to the engine coolant deck boss 252 (shown in e.g., FIG. 5). Fitting 236 is a flange-style fitting that includes a flange 246 attached to the proximal end portion 232. In some embodiments, the flange 246 is welded to the rigid tube member 224. Extending from flange 246 is a nipple 248 that includes an O-ring groove 254 to receive a corresponding O-ring 255. Nipple 248 is sized and configured to mate with a corresponding receptacle opening in the engine coolant deck boss 252 (shown in FIG. 5). Flange 246 includes a pair of mounting holes 256 sized to receive fasteners 253 (FIG. 5) which retain the nipple 248 in coolant deck boss 252 and the flange 246 against the engine's crankcase 101 (FIG. 2). In some embodiments, a gasket 247 is positioned between the flange 246 and the crankcase 101 (FIG. 2). In some embodiments, the mounting holes 256 are enlarged or elongated to allow some rotation of the flange to facilitate alignment of the first and second rigid tubes 222 and 224, respectively.

A coupling 240 connects the distal end portions 228 and 234. In this embodiment, the coupling 240 includes a flexible band 242 and a pair of fasteners 244 operative to clamp the flexible band 242 around the end portions 228 and 234. Coupling 240 is capable of accommodating misalignment (e.g., ~1 mm) and a gap (e.g., ~1-10 mm) between the distal end portions 228 and 234. Some examples of suitable couplings are available from Straub® and marketed as Grip Couplings.

Figure 9:
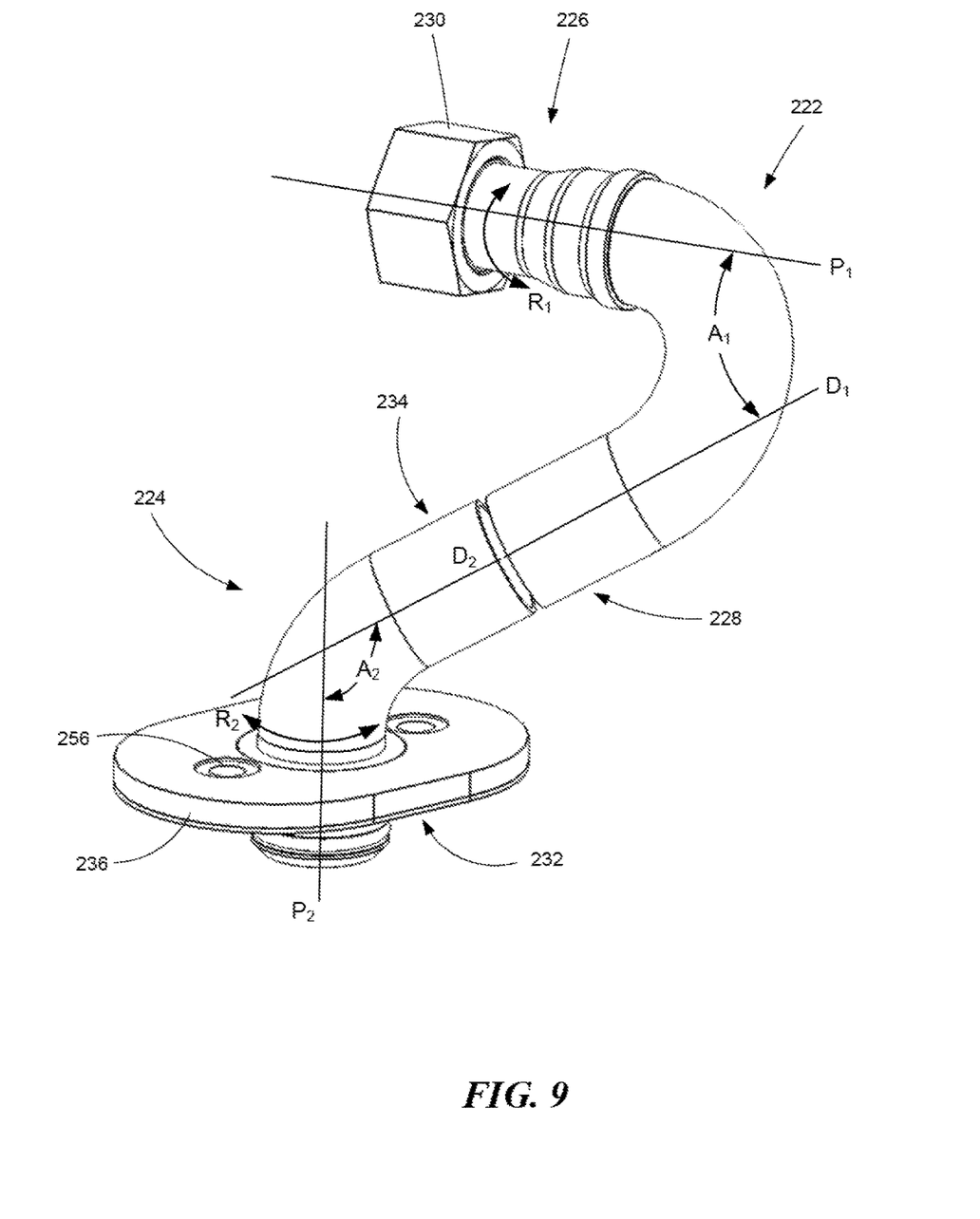
FIG. 9 is an isometric view of the fluid conduit assembly with the coupling removed for clarity.

As shown in FIG. 9, the proximal end portion 226 of the rigid tube 222 extends along a proximal axis $P_1$. The distal end portion 228 extends along a distal axis $D_1$ that is oriented at an acute angle $A_1$ with respect to the proximal axis $P_1$. The proximal end portion 232 of the rigid tube 224 extends along a proximal axis $P_2$ and the distal end portion 234 extends along a distal axis $D_2$ that is oriented at an obtuse angle $A_2$ with respect to the proximal axis $P_2$. As shown in the figure, proximal axis $P_1$ and proximal axis $P_2$ are orthogonally oriented with respect to each other. As mentioned above, the first rigid tube 222 is rotatably positionable, as indicated by arrow $R_1$, with respect to the proximal axis $P_1$, such that the distal axis $D_1$ and the distal axis $D_2$ can be substantially coaxially aligned when the fitting 230 is connected to the cylinder cooling collar 210 and the fitting 236 is connected to the engine coolant deck 212 (see FIG. 5). The second rigid tube 224 is also rotatably positionable, as indicated by arrow $R_2$, with respect to proximal axis $P_2$ in order to further facilitate alignment of the distal end portions 228 and 234. As mentioned above, however, rotation of the second rigid tube 224 is limited to the clearance in mounting holes 256.

The rigid tubes 222 and 224 can be comprised of any suitable rigid material such as metal. In various embodiments, the tubes can be formed from steel, aluminum, or high-temperature plastic, for example.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A fluid conduit assembly for connecting orthogonally oriented fluid connections, comprising:
   a first rigid tube arcuately extending from a first proximal end portion to a first distal end portion, the first proximal end portion including a first fitting connectable to a first fluid connection, and the first distal end portion extending along a first distal axis, wherein the first proximal end portion is oriented at an acute angle with respect to the first distal end portion;
   a second rigid tube arcuately extending from a second proximal end portion to a second distal end portion, the second proximal end portion including a second fitting connectable to a second fluid connection orthogonally oriented with respect to the first fluid connection, and the second distal end portion extending along a second distal axis; and
   a coupling connecting the first distal end portion and the second distal end portion for fluid communication therebetween;
   wherein the first rigid tube is rotatably positionable with respect to the first fluid connection whereby the first distal axis and the second distal axis are substantially coaxially aligned when the first fitting and second fitting are connected to the first and second fluid connections, respectively.

2. The fluid conduit assembly of claim 1, wherein the first fitting comprises an O-ring face seal fitting.

3. The fluid conduit assembly of claim 1, wherein the first proximal end portion extends along a first proximal axis oriented at an acute angle with respect to the first distal axis.

4. The fluid conduit assembly of claim 3, wherein the first rigid tube is rotatably positionable with respect to the first fluid connection about the first proximal axis.

5. The fluid conduit assembly of claim 1, wherein the second proximal end portion extends along a second proximal axis oriented at an obtuse angle with respect to the second distal axis.

6. The fluid conduit assembly of claim 5, wherein the second rigid tube is rotatably positionable with respect to the second fluid connection about the second proximal axis.

7. A coolant conduit assembly, comprising:
   a first rigid tube arcuately extending from a first proximal end portion to a first distal end portion, the first proximal end portion including a first fitting adapted to be connectable to a cylinder cooling collar, and the first distal end portion extending along a first distal axis, wherein the first proximal end portion is oriented at an acute angle with respect to the first distal end portion;
   a second rigid tube arcuately extending from a second proximal end portion to a second distal end portion, the second proximal end portion including a second fitting adapted to be connectable to an engine coolant deck, and the second distal end portion extending along a second distal axis; and
   a coupling connecting the first distal end portion and the second distal end portion for coolant communication therebetween;
   wherein the first rigid tube is rotatably positionable with respect to the cylinder cooling collar, whereby the first distal axis and the second distal axis are substantially coaxially aligned when the first fitting is connected to the cylinder cooling collar and second fitting is connected to the engine coolant deck.

8. The coolant conduit assembly of claim 7, wherein the first proximal end portion extends along a first proximal axis and the second proximal end portion extends along a second proximal axis that is orthogonal to the first proximal axis.

9. The coolant conduit assembly of claim 7, wherein the first fitting comprises an O-ring face seal fitting.

10. The coolant conduit assembly of claim 7, wherein the first proximal end portion extends along a first proximal axis oriented at an acute angle with respect to the first distal axis.

11. The coolant conduit assembly of claim 10, wherein the first rigid tube is rotatably positionable with respect to the cylinder cooling collar about the first proximal axis.

12. The coolant conduit assembly of claim 7, wherein the second proximal end portion extends along a second proximal axis oriented at an obtuse angle with respect to the second distal axis.

13. The coolant conduit assembly of claim 12, wherein the second rigid tube is rotatably positionable with respect to the engine coolant deck about the second proximal axis.

14. A cylinder coolant supply assembly, comprising:
   a cylinder cooling collar positionable around an engine cylinder;
   an engine coolant supply deck;
   a first rigid tube arcuately extending from a first proximal end portion to a first distal end portion, the first proximal end portion including a first fitting connected to the cylinder cooling collar, and the first distal end portion extending along a first distal axis;
   a second rigid tube arcuately extending from a second proximal end portion to a second distal end portion, the second proximal end portion including a second fitting connected to the engine coolant supply deck, and the second distal end portion extending along a second distal axis; and
   a coupling connecting the first distal end portion and the second distal end portion for coolant communication therebetween;
   wherein the first rigid tube is rotatably positionable with respect to the cylinder cooling collar, whereby the first distal axis and the second distal axis are substantially coaxially aligned.

15. The cylinder coolant supply assembly of claim 14, wherein the first proximal end portion extends along a first proximal axis and the second proximal end portion extends along a second proximal axis that is orthogonal to the first proximal axis.

16. The cylinder coolant supply assembly of claim 14, wherein the first fitting comprises an O-ring face seal fitting.

17. The cylinder coolant supply assembly of claim 14, wherein the first proximal end portion extends along a first proximal axis oriented at an acute angle with respect to the first distal axis.

18. The cylinder coolant supply assembly of claim 17, wherein the first rigid tube is rotatably positionable with respect to the first fluid connection about the first proximal axis.

19. The cylinder coolant supply assembly of claim 14, wherein the second proximal end portion extends along a second proximal axis oriented at an obtuse angle with respect to the second distal axis.

20. The cylinder coolant supply assembly of claim 19, wherein the second rigid tube is rotatably positionable with respect to the engine coolant supply deck about the second proximal axis.

* * * * *